US011656244B2

(12) United States Patent
Dobler et al.

(10) Patent No.: US 11,656,244 B2
(45) Date of Patent: May 23, 2023

(54) COMPENSATING CONTROL SIGNAL FOR RASTER SCAN OF A SCANNING PROBE MICROSCOPE

(71) Applicant: Bruker Nano GmbH, Berlin (DE)

(72) Inventors: Wolfgang Dobler, Potsdam (DE); Danilo Nitsche, Berlin (DE); Frederik Büchau-Vender, Berlin (DE)

(73) Assignee: Bruker Nano GmbH, Berlin (DE)

( * ) Notice: Subject to any disclaimer, the term of this patent is extended or adjusted under 35 U.S.C. 154(b) by 0 days.

(21) Appl. No.: 16/952,579

(22) Filed: Nov. 19, 2020

(65) Prior Publication Data
US 2021/0190818 A1    Jun. 24, 2021

(30) Foreign Application Priority Data
Nov. 21, 2019 (DE) .................... 10 2019 131 421.6

(51) Int. Cl.
*G01Q 10/06* (2010.01)
*G01Q 30/04* (2010.01)

(52) U.S. Cl.
CPC ........... *G01Q 10/065* (2013.01); *G01Q 30/04* (2013.01)

(58) Field of Classification Search
CPC ...... G01Q 10/065; G01Q 30/04; G01Q 70/04; G01Q 10/06; G01Q 20/04; G01Q 70/02; B82Y 35/00
See application file for complete search history.

(56) References Cited

U.S. PATENT DOCUMENTS

| 4,871,938 A | * | 10/1989 | Elings | .................... | G01Q 60/16 |
| | | | | | 310/317 |
| 5,051,646 A | * | 9/1991 | Elings | .................... | B82Y 35/00 |
| | | | | | 310/317 |

(Continued)

FOREIGN PATENT DOCUMENTS

EP    2183569    12/2017

OTHER PUBLICATIONS

Waidkaye et al., "A Serial-Kinematic Nanopositioner for High-Speed Atomic Force Microscopy", Review of Scientific Instruments 85, 105104, Oct. 13, 204.

(Continued)

*Primary Examiner* — Wyatt A Stoffa
(74) *Attorney, Agent, or Firm* — Boyle Fredrickson S.C.

(57) ABSTRACT

The invention relates to a measuring device for a scanning probe microscope that includes a sample receptacle which is configured to receive a measurement sample to be examined, a measuring probe which is arranged on a probe holder and has a probe tip with which the measurement sample can be measured. A displacement device is configured to move the measuring probe and the sample receptacle relative to each other, in order to measure the measurement sample, such that the measuring probe, in order to measure the measurement sample, executes a raster movement relative to said measurement sample in at least one spatial direction. Movement measurement signals indicating a first movement component in a first spatial direction that disrupts the raster movement and a second movement component in a second spatial direction that disrupts the raster movement, which second spatial direction extends transversely to the first spatial direction. Compensating control signal components cause a first countermovement which substantially compensates for the first disruptive movement component in the first spatial direction, and/or cause a second countermovement (Continued)

which substantially compensates for the second disruptive movement component in the second spatial direction.

15 Claims, 5 Drawing Sheets

(56) References Cited

U.S. PATENT DOCUMENTS

| | | | | |
|---|---|---|---|---|
| RE34,331 E * | 8/1993 | Elings | ............. | G01Q 60/16 250/306 |
| 5,557,156 A * | 9/1996 | Elings | ............. | G01B 7/003 977/851 |
| 6,308,557 B1 * | 10/2001 | Heiland | ............. | G01Q 70/04 73/105 |
| 8,904,560 B2 * | 12/2014 | Shi | ............. | B82Y 35/00 850/3 |
| 9,397,587 B2 * | 7/2016 | Youcef-Toumi | ....... | G01Q 30/04 |
| 10,041,970 B2 * | 8/2018 | Zou | ............. | G01Q 10/065 |
| 11,156,632 B2 * | 10/2021 | Knebel | ............. | G01Q 10/065 |
| 11,335,050 B2 * | 5/2022 | Dhanuka | ............. | G06T 7/136 |
| 11,340,279 B1 * | 5/2022 | Fitzgerald | ............. | G08B 21/185 |
| 2004/0182140 A1 * | 9/2004 | Weide | ............. | B82Y 35/00 318/128 |
| 2004/0207396 A1 * | 10/2004 | Xiao | ............. | G01Q 10/04 324/252 |
| 2007/0251305 A1 * | 11/2007 | Huang | ............. | B82Y 35/00 73/105 |
| 2011/0277192 A1 * | 11/2011 | Park | ............. | G01Q 10/065 850/1 |
| 2014/0283227 A1 * | 9/2014 | Mosley | ............. | B82Y 35/00 850/1 |
| 2015/0137712 A1 * | 5/2015 | Youcef-Toumi | ....... | G01Q 10/04 318/38 |
| 2015/0198630 A1 * | 7/2015 | Shi | ............. | G01Q 10/065 850/3 |
| 2016/0266166 A1 * | 9/2016 | Shi | ............. | G01Q 10/065 |
| 2021/0341513 A1 * | 11/2021 | Osborne | ............. | G01Q 60/38 |

OTHER PUBLICATIONS

Fleming et al. "Sensor Fusion for Improved Control of Piezoelectric Tube Scanners", IEEE Transactions of Control Systems Technology, vol. 16, No. 6, Nov. 2008.
Pao et al., "Combined Feedforward/Feedback Control of Atomic Force Microscopes," Proceedings of the 2007 American Control Conference, Marriott Marquis Hotel at Times Square, New York City Jul. 11-13, 2007.
Rana et al., "Improvement in the Imaging Performance of Atomic Force Microscopy: A Survey", IEEE Transactions of Automation Science and Engineering, vol. 14, No. 2, Apr. 2017.
Yong et al. "High-Speed Flexure-Guided Nanopositioning: Mechanical Design and Control Issues", Rev. Sci. Instrum. 83 121101 (2012), Dec. 10, 2012.
Leang et al. "Feedforward Control of Piezoactuators in Atomic Force Microscope Systems", IEEE Control Systems Magazine, Feb. 2009, pp. 70-82.

* cited by examiner

COMPENSATING CONTROL SIGNAL FOR RASTER SCAN OF A SCANNING PROBE MICROSCOPE

FIELD OF THE INVENTION

The invention relates to a measuring device for a scanning probe microscope, to a scanning probe microscope, and to a method for scanning probe microscopic examination of a measurement sample by means of a scanning probe microscope.

BACKGROUND

Scanning probe microscopes are known as such in various embodiments. They are used to examine measurement samples by scanning probe microscopy. To sample the measurement sample, a relative movement takes place between a probe tip of a measuring probe and a sample receptacle on which the measurement sample is arranged for the examination. The measuring probe and sample receptacle are moved relative to each other by means of a displacement device. The probe tip and the measurement sample interact. Measurement signals are detected for the interaction.

Such an atomic force microscope can have a resiliently flexible lever arm, at the end of which the probe tip is located. The displacement device has drives for relative displacement between the probe tip and a measurement sample to be examined, piezo actuators, for example, being used as drives in atomic force microscopy. A detection unit for measuring the force on the lever arm is also provided. The components are fixed to one or more holders depending on the design. The movement of the drives can execute unintentional movements or excite internal vibrations of the corresponding holder structure by mechanical coupling of the different movement axes, for example when said drives execute a periodic oscillation movement during measurement, independently of their own resonance behavior. The result is a falsified image of the surface or the surface property of the sample because the expected trajectory generated by the targeted control of the drives does not correspond to the real relative movement between the probe tip and the sample.

During the probe microscopic examination, the measurement sample is raster scanned using the measuring probe (probe tip). It must be ensured in this case that the raster scanning actually executed by the measuring probe during the examination also corresponds to a raster pattern specified and planned for the measurement-based examination, so that the image of the measurement sample generated during the raster scanning is not distorted. In known scanning probe microscopes, problems can arise in this connection if the piezo elements used in the displacement device cause a non-linear movement. In addition, what are referred to as creeps can also occur, leading to the measuring probe, which can be designed as a cantilever for example, and the measurement sample moving relative to each other in addition to the raster scanning movement. In this case, the deflection between two components is generally measured by means of sensors, one of the components being moved by the displacement device and the other component not being moved. In this case, the measurement data evaluation regularly assumes that the connections between the displacement device (and its receptacle) and the location of the interaction between the measuring probe and the measurement sample are rigid. At higher scanning or sampling speeds (raster scanning frequency), this assumption is usually no longer applicable and therefore image distortions arise that can no longer be recognized by the sensor, and thus cannot be corrected.

SUMMARY OF THE INVENTION

The object of the invention is to provide a measuring device for a scanning probe microscope, a scanning probe microscope, and a method for scanning probe microscopic examination of a measurement sample by means of a scanning probe microscope, in which a measurement sample examination can be executed with improved accuracy.

In order to achieve said object, a measuring device for a scanning probe microscope according to independent claim 1 is provided. Furthermore, a scanning probe microscope and a method for scanning probe microscopic examination of a measurement sample by means of a scanning probe microscope according to independent claims 14 and 15 are provided. Embodiments are the subject matter of dependent claims.

According to one aspect, a measuring device for a scanning probe microscope is provided that comprises the following: a sample receptacle that is configured to receive a measurement sample to be examined; a measuring probe that is arranged on a probe holder and has a probe tip with which the measurement sample can be measured; a displacement device that is configured to move the measuring probe and the sample receptacle relative to each other, in order to measure the measurement sample, such that the measuring probe, in order to measure the measurement sample, executes a raster movement relative to said measurement sample in at least one spatial direction; a control device that is connected to the displacement device and controls the relative movement between the measuring probe and the sample receptacle; and a sensor device that is configured to detect movement measurement signals for an actual movement of the measuring probe and/or of the sample receptacle that is executed during the relative movement between the measuring probe and the sample receptacle in order to measure the measurement sample, and to relay the movement measurement signals to the control device, the movement measurement signals indicating a first movement component in a first spatial direction that disrupts the raster movement and a second movement component in a second spatial direction that disrupts the raster movement, which second spatial direction extends transversely to the first spatial direction. The control device is further configured to control the relative movement between the measuring probe and the sample receptacle as a function of the movement measurement signals in such a way that the displacement device is acted upon by the control device with compensating control signal components, which, for the movement of the measuring probe and/or the sample receptacle, cause a first countermovement which substantially compensates for the first disruptive movement component in the first spatial direction, and/or cause a second countermovement which substantially compensates for the second disruptive movement component in the second spatial direction.

According to a further aspect, a scanning probe microscope comprising the measuring device is provided.

According to a further aspect, a method is provided for scanning probe microscopic examination of a measurement sample by means of a scanning probe microscope, the method comprising the following steps: Arranging a measurement sample on a sample receptacle of a scanning probe microscope and examining, by probe microscopy, the measurement sample by means of a measuring probe that is arranged on a probe holder and has a probe tip. In this case, the measuring probe and the sample receptacle are moved relative to each other by means of a displacement device such that the measurement sample executes a raster movement relative to the measurement sample in at least one spatial direction. A control device is provided that is connected to the displacement device and controls the relative movement between the measuring probe and the sample receptacle. By means of a sensor device, movement measurement signals for a movement of the measuring probe and/or a movement of the sample receptacle that is executed during the relative movement between the measuring probe and the sample receptacle are detected, the movement measurement signals indicating a first movement component in a first spatial direction that disrupts the raster movement and a second movement component in a second spatial direction that disrupts the raster movement, which second spatial direction extends transversely to the first spatial direction. The movement measurement signals are relayed to the control device. The control device controls the relative movement between the measuring probe and the sample receptacle as a function of the movement measurement signals in such a way that the displacement device is acted upon by the control device with compensating control signal components, which, for the movement of the measuring probe and/or the sample receptacle, cause a first countermovement which substantially compensates for the first disruptive movement component in the first spatial direction, and/or cause a second countermovement which substantially compensates for the second disruptive movement component in the second spatial direction.

By means of the sensor device, the movement actually executed during the measurement by the measuring probe and/or measurement sample that is arranged on the sample receptacle is detected and fed back to the control device such that said control device can generate the control signals for the displacement device for the relative movement of the measuring probe and measurement sample in dependence thereon. If the movement actually executed by the measuring probe and measurement sample during the raster scanning or sampling of the measurement sample deviates from the raster movement specified for the scanning probe microscopic examination, this can be corrected in this way. It is hereby ensured in an improved manner that the relative movement between the measuring probe and the sample receptacle (raster scanning the measurement sample) executed during the examination of the measurement sample corresponds to the movement planned and specified for the examination.

A raster movement (raster scanning) in the sense of the present disclosure is a relative movement between the measuring probe and the measurement sample in order to bring the measuring probe into interaction with an examining region of the measurement sample. For example, a triangular movement can be executed in a direction lateral to the measurement sample, and a step function can be executed in the other lateral direction such that a rectangular region of the measurement sample is raster scanned.

The first or the second spatial direction (spatial axis) can correspond to the at least one spatial direction of the raster movement.

The sensor device can be configured to detect the movement measurement signals in the context of an absolute measurement. An absolute measurement in the sense of the present disclosure is a measurement of a physical quantity based on an inertial system, which means that the measurement is carried out without any reference points—i.e., in particular without any reference points on the measuring device, as well as in the vicinity of the measuring device—for example, a laboratory.

The sensor device can be configured to detect movement measurement signals for the actual movement of the measuring probe and/or the sample receptacle, which movement measurement signals indicate a first movement component in the x direction of an x-y plane of the sample receptacle that disrupts the raster movement.

The movement measurement signals can include position measurement signals for the first movement component in the first spatial direction that disrupts the raster movement and for the second movement component in the second spatial direction that disrupts the raster movement.

The control device and the displacement device can be configured to execute the raster movement of the measuring probe relative to the measurement sample as a periodic movement in the at least one spatial direction during the measurement of the measurement sample. The execution of a sinusoidal or a triangular periodic movement in at least one spatial direction can be provided.

The control device and the displacement device can be configured to control the periodic movement of the measuring probe relative to the measurement sample with respect to an amplitude and/or a phase of the periodic movement as a function of the movement measurement signals during the measurement of the measurement sample. Based on the movement signals detected for the movement of the measuring probe and/or the movement of the sample receptacle, for example in the context of an absolute measurement, control signals are generated for controlling the oscillating movement for raster scanning the measurement sample.

The control device and the displacement device can further be configured to control the periodic movement of the measuring probe relative to the measurement sample with respect to an amplitude and/or a phase of the periodic movement as a function of the movement measurement signals during the measurement of the measurement sample.

The sensor device can be configured, when measuring the measurement sample, to detect, as a function of time, first movement measurement signals for a movement of the measuring probe or sample receptacle, which is moved to execute the relative movement between the measuring probe and the sample receptacle. An acceleration sensor, for example, can be used for this purpose. Speed and distance information for the movement of the measuring probe or the sample receptacle can be derived from the measurement signals that are provided by means of the sensor device by means of integration. The first movement signals are recorded for a component of the measuring device that is moved by means of the displacement device during the measurement of the measurement sample and the relative movement executed for this purpose between the measuring probe and the sample receptacle.

The sensor device can be configured, when measuring the measurement sample, to detect, as a function of time, second movement measurement signals for a movement of the sample receptacle or measuring probe which is not moved by means of the displacement device to execute the relative movement between the measuring probe and the sample receptacle. An acceleration sensor, for example, can be used for this purpose. In this way, movement information can also be recorded for the sample receptacle or the measuring probe. Such an additional and unintentional movement can also occur, in particular at higher scanning or sampling speeds, for the component of the measuring device that is not moved in a targeted manner for measuring the measurement sample (to execute the relative movement between the measuring probe and the sample receptacle) and for which therefore an immobile rest position is assumed in the prior art. By means of integration, information about absolute values for the speed and the path of the movement can, for example, be derived from the acceleration signals.

The sensor device can be formed at least in part on the probe holder. On the probe holder, the sensor device can be arranged adjacent to the mounting of the measuring probe on the probe holder, in particular in the immediate vicinity thereof. The sensor device can in this case be arranged on an outer surface of the probe holder. Alternatively, the sensor device can be integrated into a housing or a block of the probe holder. The sensor device can partially in part be part of the measuring probe. The sensor device can be formed at least in part on the sample receptacle. In conjunction with the at least partial formation of the sensor device on the sample receptacle, the explanations given above in connection with the probe holder for design options apply accordingly.

The sensor device can have a capacitive sensor device.

The control device and the displacement device can be configured to execute the raster movement of the measuring probe relative to the measurement sample with an oscillation frequency of at least approximately 100 Hz during the measurement of the measurement sample. Oscillation frequencies up to approximately 1 kHz, or alternatively up to approximately 20 kHz, can be provided. It was surprisingly found that the measurement accuracy suffers, or even falsified measurement results were found, at oscillation frequencies above approximately 100 Hz. The reason for this is additional movements of the components or functional elements of the measuring device that can be caused, for example, by resonance oscillations. In particular at such oscillation frequencies, improved measurement results can be achieved with the proposed technology. It was surprisingly found that the measurement accuracy suffers, or even falsified measurements result, at oscillation frequencies above approximately 100 Hz. The reason for this is additional movements of the components or functional elements of the measuring device that can be caused, for example, by resonance oscillations. In particular at such oscillation frequencies, improved measurement results can be achieved with the proposed technology.

A further sensor device can be provided, which is configured to detect further movement signals in the context of a relative movement, in particular to be able to measure and optionally compensate for slow movements that are not subject to the problems described above, without permitting possible disadvantages of an absolute measurement, such as high noise, in the case of slow movements. This can be a relative movement in relation to the probe holder, for example relative to the stand component. The further sensor device can be formed, for example, on a stand component on which the displacement device is accommodated, and on the probe holder. The further sensor device can have a distance sensor device that is configured to detect, as a function of time, a distance between the stand component and the probe holder that changes during measurement of the measurement sample as a result of the movement caused by the displacement device. The detection of the distance that changes over time provides a measure for the relative movement between the measuring probe and the sample receptacle that is executed during the scanning probe microscopic examination of the measurement sample. The distance sensor device can be formed, for example, having one or more distance sensors that are formed on the stand component and on the displacement device so as to be assigned to each other. The further sensor device can have, for example, a capacitive sensor, a strain gauge, a differential transformer, or another relative sensor.

The sensor device can be formed having a first sensor element on the probe holder and having a second sensor element, assigned to the first sensor element, on the sample receptacle. The signals for the first and second sensor elements result in a relative measurement for each spatial direction, without the need for complex alignment of the sensor elements. The first and the second sensor element can, for example, be arranged opposite each other.

The further sensor device can be used to control the relative movement between the measuring probe and the sample receptacle during the raster scanning of the measurement sample, the first and optionally the second sensor device correcting the controlling. It can be provided that the correction only begins from a threshold speed, for example from approximately 100 Hz, in particular in the case of a sinusoidal movement.

The control device can be configured to control the relative movement between the measuring probe and the sample receptacle as a function of the movement measurement signals using or by means of a coupled control. In this case, the compensating control signal component, which provides the first countermovement in the first spatial direction for the movement of the measuring probe and/or the sample receptacle, is provided taking into account a movement of the measuring probe and/or the sample receptacle that is caused by a movement of the measuring probe and/or the sample receptacle in the second spatial direction. The movement in the second spatial direction causes a movement in the first spatial direction.

The embodiments given above in connection with the measuring device can be provided accordingly for the scanning probe microscope and/or the method for scanning probe microscopic examination of the measurement sample by means of the scanning probe microscope.

BRIEF DESCRIPTION OF THE DRAWINGS

Further embodiments are explained in detail below with reference to the drawings, in which.

DETAILED DESCRIPTION OF THE PREFERRED EMBODIMENTS

Figure 1:
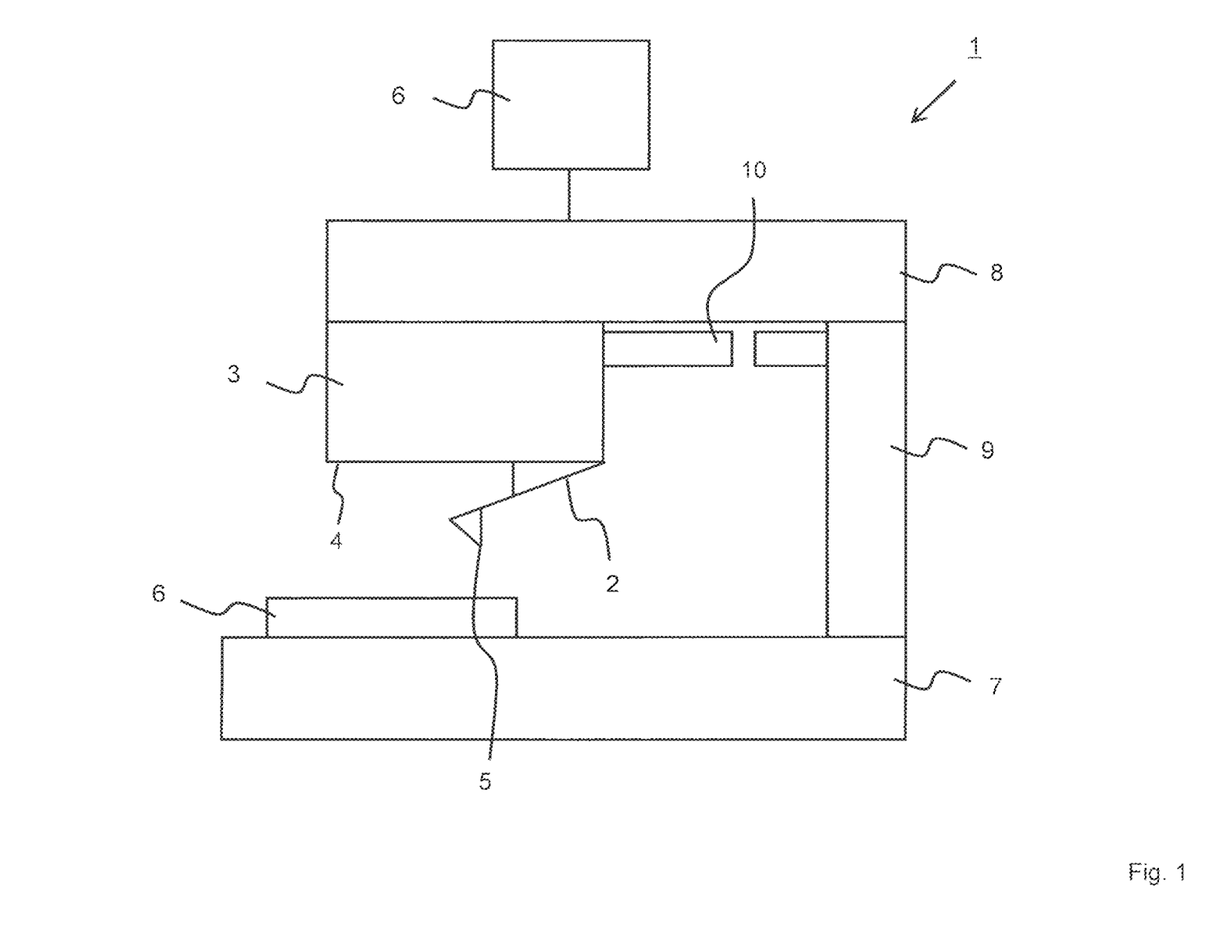
FIG. 1 is a schematic representation of a measuring device for a scanning probe microscope.

FIG. 1 is a schematic representation of a measuring device 1 for a scanning probe microscope. Scanning probe microscopes are known as such in various embodiments, for example also as atomic force microscopes (AFM). A measuring probe 2, which can also be called a near-field probe and which is, for example, a cantilever, is accommodated on a probe holder 3, specifically on an underside 4 of the probe holder 3. In scanning probe microscopy, the interaction of the measuring probe 2 with a measurement sample 6 is detected. The measurement sample 6 to be examined is scanned point-by-point in a raster process by means of this measuring probe 2. The measured values resulting for each individual point can then be combined to form a digital image.

For probe microscopic examination, a probe tip or measuring tip 5 of the measuring probe 2 is arranged opposite the measurement sample 6, which is arranged on a sample receptacle 7, optionally on a sample holder arranged thereon (not shown). With the aid of a displacement device 8, which is accommodated on a stand component 9, the probe holder 3 with the measuring probe 2 is moved relative to the sample receptacle 7 with the measurement sample 6 in order to scan (raster scan) the measurement sample 6. What is referred to as a force detection is executed, with which a measure for an interaction between the probe tip 5 and the measurement sample 6 is detected. In accordance with this interaction, the probe tip 5 is deflected, for example toward the measurement sample 6. This deflection of the probe tip 5 can be detected, for example, in accordance with the light pointer principle. In this case, for example, a measuring light beam is directed onto a portion of the measuring probe 2 and reflected there in a known manner. The reflected light beam is then detected with a light-sensitive element, for example a photodiode. This measuring principle is known as such in various embodiments and therefore need not be explained further here.

By means of a sensor device 10, movement measurement signals are detected for an actual movement of the measuring probe 2 and/or of the sample receptacle 7, said actual movement being executed during the relative movement between the measuring probe 2 and the sample receptacle 7 in order to measure the measurement sample 6. The movement measurement signals are relayed to a control device 11, the movement measurement signals indicating a first movement component in a first spatial direction that disrupts the raster movement executed in order to measure the measurement sample 6, and a second movement component in a second spatial direction that disrupts the raster movement, which second spatial direction extends transversely to the first spatial direction.

In an exemplary embodiment, the sensor device 10 has two position sensors 20, 21 (see FIG. 3), one for each spatial direction. In the following description, we will assume position sensors for the purpose of simplified representation; a generalization to other sensor types for measuring, for example, temporal derivatives of the position is possible without great effort.

Figure 3:
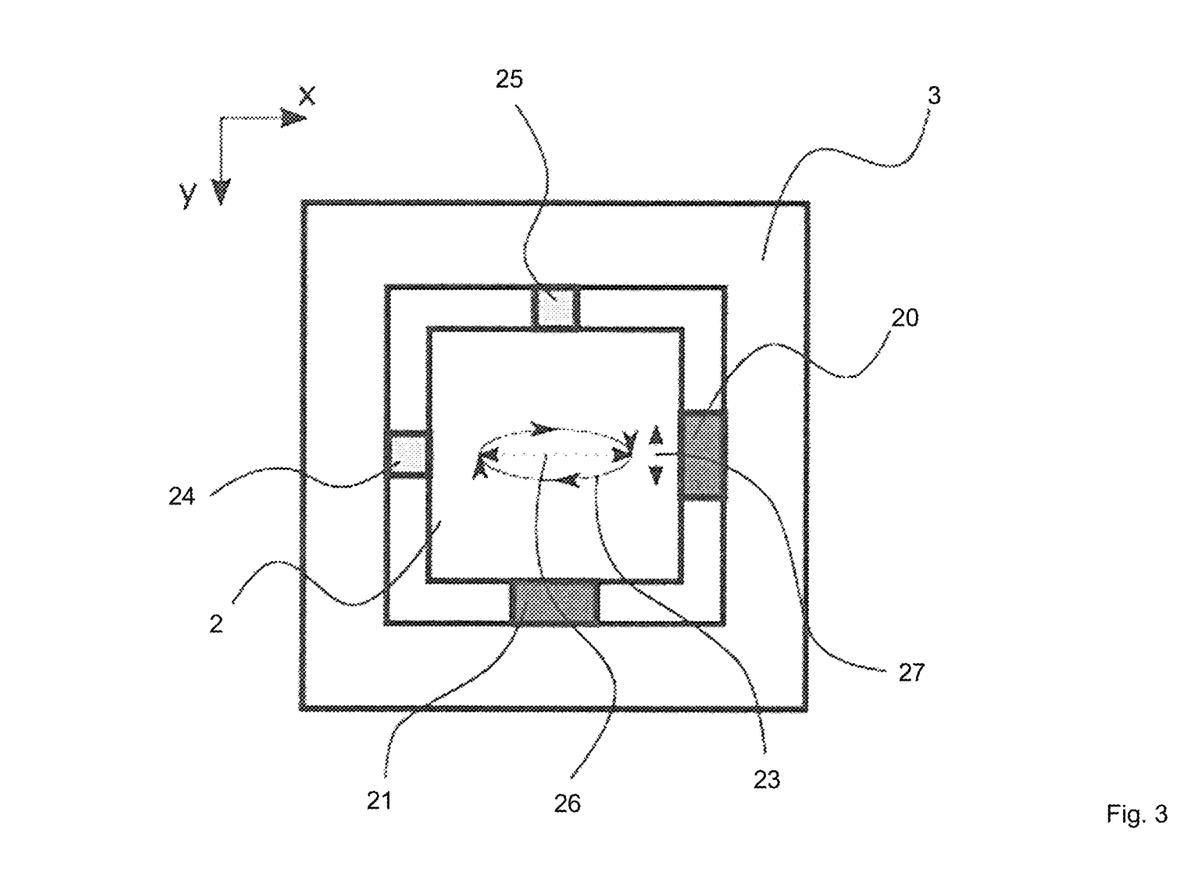
FIG. 3 is a schematic representation of an embodiment having mechanical coupling that is suppressed.

For a scanning probe microscope, capacitive sensors for two position sensors 20, 21 can be used, which measure a relative displacement of the measuring probe 2 relative to the stand component 9. The position sensors 20, 21 can have two electrodes 22, 23 that form a plate capacitor and the distance between which determines the capacitance of said plate capacitor. It is usually assumed that the position of the stand component 9 does not move relative to the measurement sample 6. The measuring apparatus is mechanically decoupled from external disturbances as far as possible. If the position sensors 20, 21 nevertheless measure a total movement 23 that is not specified by the control of drives 24, 25 of the displacement device 8 and results from the superimposition of the actual trajectory (actual movement path) 26 which is generated in a targeted manner and the movement caused by the coupling 27 of the measuring probe 2, the actual trajectory 23 cannot be sufficiently corrected with respect to the measurement sample 6 by an independent control of the two axes.

Figure 4:
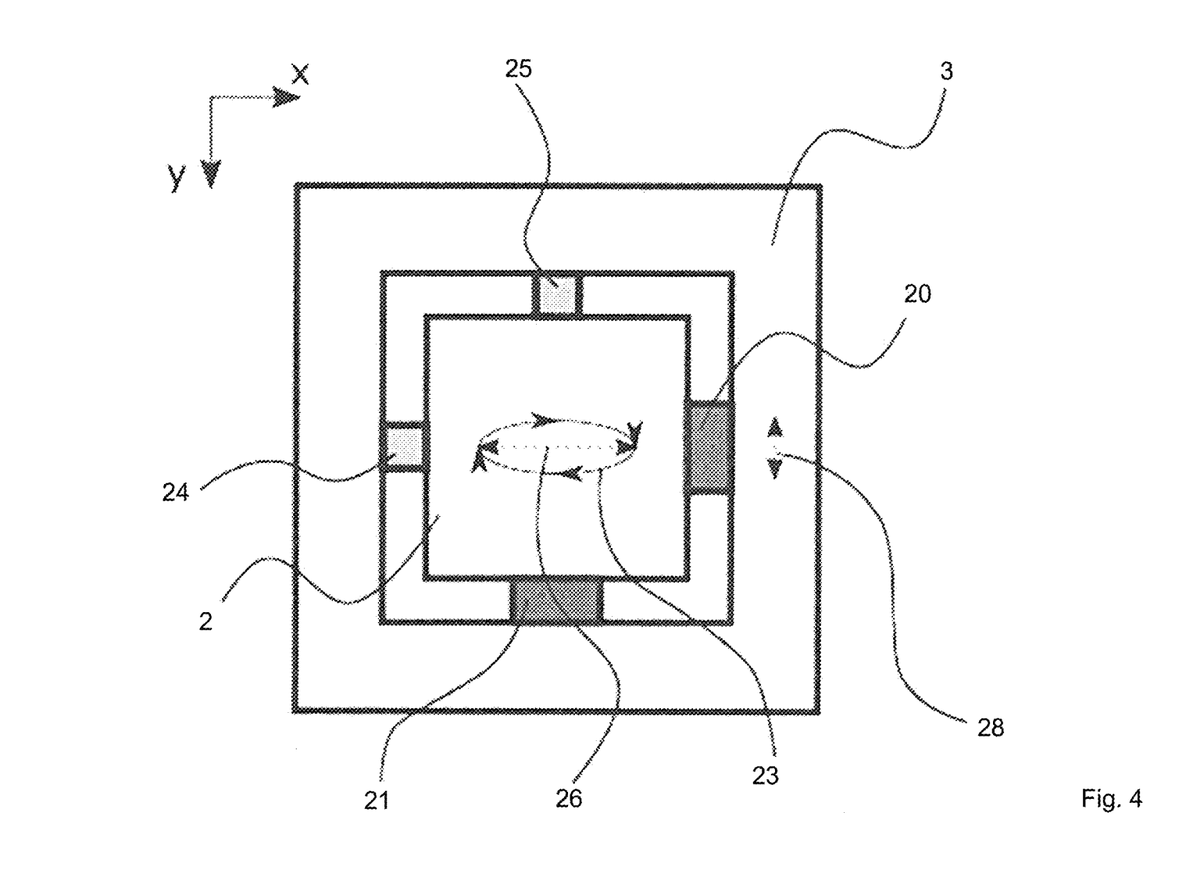
FIG. 4 is a schematic representation of an embodiment having internal vibration of a holder, which is taken into account.

For rapid periodic scanning or sampling movements of the measuring probe 2, it may also occur that the sensor holder 6 is no longer spatially rigid with respect to the measurement sample 6, for example due to excitation of mechanical resonances 28 of the measuring apparatus.

Figure 5:
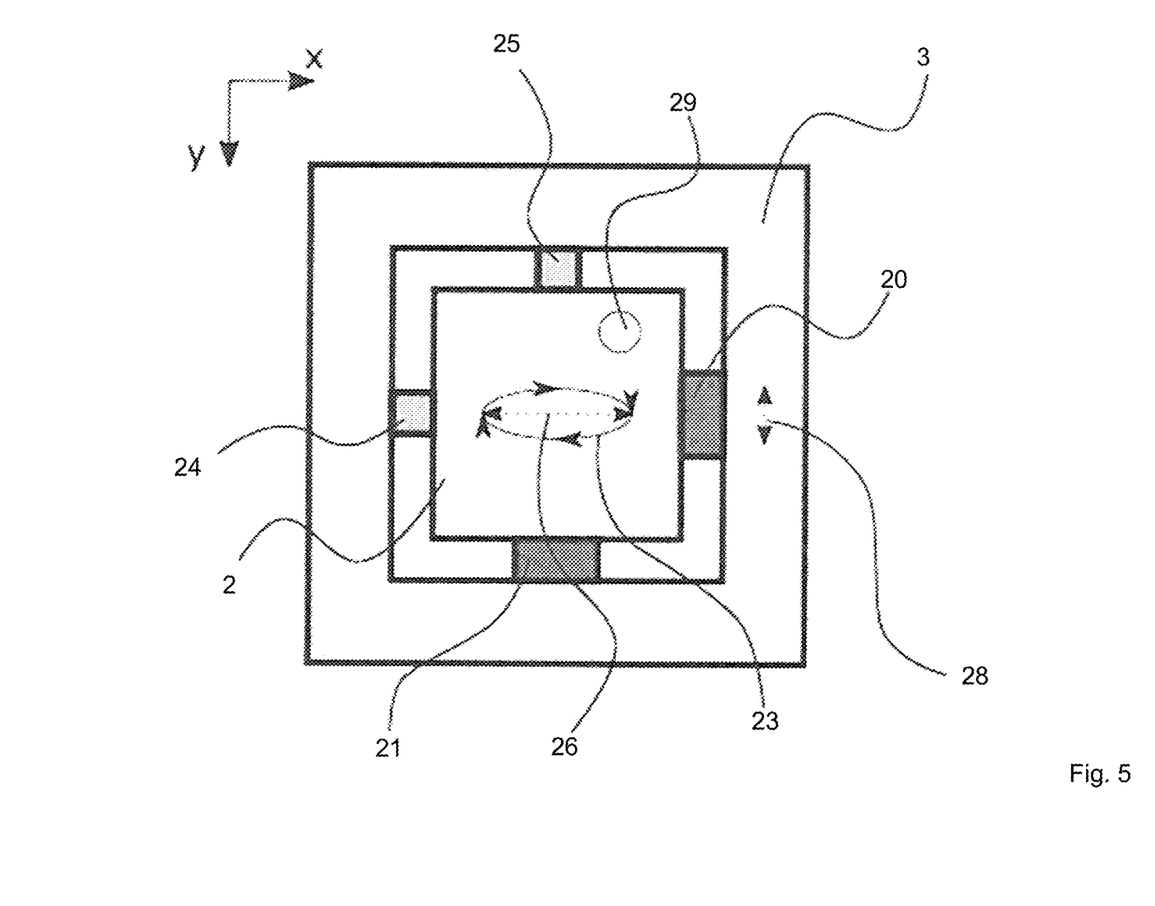
FIG. 5 is a schematic representation of an embodiment in which an additional sensor is provided.

When position sensors are attached within the measuring apparatus, the total movement 23 (real displacement) of the probe tip 5 with respect to the measurement sample 6 is no longer measured with sufficient accuracy in this case. In this case, a further sensor 29 is used, which additionally measures the movement of the holder structure or the total movement 23 of the probe tip 5, i.e. the superimposition of the holder movement with the actual trajectory 26 generated by the drives 24, 25. The closer the further sensor 29 is placed to the probe tip 5, the more precisely the deviations that actually occur between the probe tip 5 and the target movement can be determined and thus corrected.

The desired movement of the measuring or probe tip 5 at the time t can be written in the following form:

$$\vec{r}(t) = \vec{r}_0 + \vec{v}_0 t + \vec{r}_\omega(t). \tag{1}$$

In this case, $\vec{r}_0$ is a reference point in space, and $\vec{v}_0$ is a velocity vector to describe the continuous sampling movement in an axis. Usually, this is the movement of the slow scanning direction, for example the advancement of the lines. $\vec{r}_\omega(t)$ is a periodic movement having an angular frequency co and higher harmonics up to the order N in complex notation:

$$\vec{r}_\omega(t) = \Sigma_{n=1}^{N} \vec{c}_n e^{-in\omega t}. \tag{2}$$

In a typical control loop, an attempt is made to control the whole curve $\vec{r}(t)$. At higher speeds, the control provides increasing deviations from the target trajectory, which is why a feed forward control ("feed forward") is provided instead. In contrast to control processes in which the input is adjusted at individual times due to the deviations in the output, provision is made for a plurality of measured values along a trajectory to be taken into account in order to correct the entire set of coefficients $\vec{c}_n$ of the input. Such a procedure can also be referred to as "iterative learning control".

In one possible embodiment, the control is divided into two parts (see FIG. 2): The constant component and the linear component $\vec{r}_0 + \vec{v}_0 t$ are controlled by the normal slow control loop. It can be provided in this case that the control only regulates to components co. This can be realized using a low-pass filter 11, for example. The faster periodic movements of the individual spatial axes (whose amplitude may in principle also be zero) are controlled by a feed forward control 12, which will be explained further below.

An embodiment for a control loop is explained below.

The desired target movement $\vec{r}(t)$ is transmitted to the probe tip 5 by means of the drives 24, 25. Due to the response function of the system consisting of the probe tip 5, drives 24, 25 of the displacement device 8 and other electronic components, the resulting movement of the measuring or probe tip 5 does not exactly correspond to the desired movement; inter alia, the real movement may be delayed in time. If the real movement of the probe tip 5 is now continuously measured, an iterative method (feed forward control) can then be used to adapt a controlling function of the displacement device 8 with the drives 24, 25 in such a way that the desired periodic movement is achieved with sufficient accuracy after a few iterations.

The following problems can arise, which can at least hinder the achievement of the desired movement:

Mechanical and electronic coupling/crosstalk: Disturbances of this type cannot be adequately eliminated in the case of separate control of the individual spatial axes because the change in controlling in one direction is accompanied by a change in the other direction.

The measuring apparatus consisting of a control, a probe tip 5 and a sensor device oscillates as a whole relative to the measurement sample: The position measurement by an internally attached position sensor of the measuring apparatus does not allow adequate control of the actual movement toward the target movement of the probe tip 5 relative to the measurement sample 6, due to the superimposed movements with the movement of the holder structure.

External, constant, periodic disturbances that correspond to the base frequency ω of internal vibrations or one of the higher harmonics and excite them.

Nonlinearities of the response function, which, when excited with a frequency, also excite the harmonics thereof.

Known control loops for scanning probe microscopes each control one axis independently. A distinction is made between model-based and model-free algorithms. For model-based algorithms, the system is modeled and an attempt is made to invert the response function and adapt the controlling in such a way that the output signal corresponds to the desired signal.

Model-free algorithms are usually understood to mean iterative methods that calculate the inverse response function by means of iteration and, if necessary, can adapt to a response function that changes over time. A coupled, model-free method is explained below that, with the aid of the measurement data of the sensor device, in particular of the position sensors 20, 21, achieves a significantly improved control of the actual movement of the measuring probe 2 toward the target movement relative to the measurement sample 6, even when the above-mentioned disturbances occur.

A periodic scanning or sampling movement is broken down into Fourier coefficients by means of a spectral analysis from measured values of the position sensors 20, 21 over at least one period. If a position sensor is used that measures a certain derivative of the scanning movement, the Fourier coefficients must be corrected accordingly. For a speed sensor, this means a phase adjustment by 90° and an amplitude adjustment by the factor $\omega^{-1}$. With all the coefficients determined in this way, the control for the displacement device 8 can then be dynamically adapted in such a way that the real movement of the measuring or probe tip 5 comes very close to the target movement after a few periods.

The different types of sensors have different advantages and disadvantages:

Sensor type 1—position sensors, for example capacitive sensors: These typically allow very precise position determination for slow movements. In the case of rapid, periodic measurement movements, the measured values of the relative position of the measuring probe to the sample can be systematically falsified due to natural vibrations of the measuring device.

Sensor type 2—speed or acceleration sensors or a sensor for determining a higher derivative of the current position: These can very precisely measure the speed/acceleration for sufficiently fast periodic movements. An absolute global position of the measuring probe in relation to the sample by means of integration is rather difficult to determine due to slow or low-frequency translations.

For frequencies of the sampling movement (scanning movement) at which only mechanical or electronic coupling occurs, a correction of the actual trajectory (actual movement path) toward the target trajectory (target movement path) can be achieved, for example, with the aid of the position sensors (sensor type 1). For other disturbances, for example, either a further position sensor can be provided that measures the movement of the holder structure and includes said movement in the control, or a type 2 sensor can be used.

By dividing the control responsibilities among the sensor types, the control accuracy can be significantly improved. In the case of line rates above a threshold frequency (depending on the quality of the sensor and the internal vibrations of the measuring apparatus), additional data from sensor type 2 are then used for the control. Said data can contain information about vibrational movements of the holder structure that occur when the measured values are broken down into the Fourier coefficients and can thus be corrected using the control algorithm. In order to keep the absolute global position of the scan region constant, the zero order of the spectral coefficients from sensor type 1 (to be equated with the average over a period) is used for the outer slow control loop. The control is shown by way of example in FIG. 2.

Figure 2:
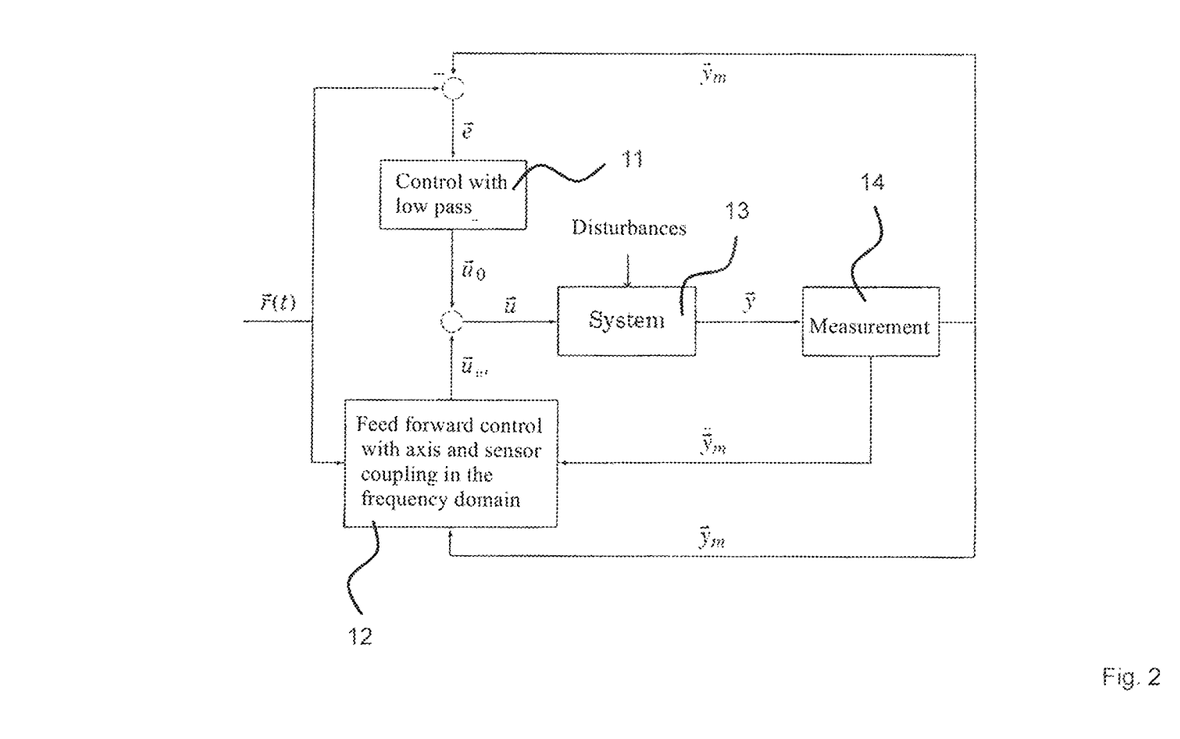
FIG. 2 is a schematic representation of a flow chart for a coupled control, that is, a control in which measurement signals are detected by different sensors and in all spatial directions.

FIG. 2 is a schematic representation of a flow chart for a coupled control, that is, a control in which measurement signals are detected by different sensors and in all spatial directions. The measurement signals (measurement data) from sensor type I ($\vec{y}_m$) are fed into a normal control loop with the low pass 11. All periodic measurement signals (sensor data) can be used in the feed forward control 12 in order to calculate the inverse of the system response. During the iterations of the feed forward control 12, an attempt is made to regulate the periodic component of the measurements to the periodic component of the setpoint $\vec{r}(t)$.

The method for a feed forward control including coupling of one or all spatial axes or directions is derived below for an embodiment. In this case, work is carried out in the frequency domain, such that all parameters explicitly depend on the frequency and are complex numbers. The combination of system 13 and measuring apparatus 14 (see FIG. 2), i.e., for example, the measuring device 1 from FIG. 1, transforms an input signal $\vec{u}$ into a measurement signal $\vec{y}$, which can be written as $$\vec{y} = G(\vec{u}) \qquad (3)$$

In general, G is a nonlinear operator (a nonlinear function of $\vec{u}$). Depending on the type of sensor used, measurement values $\vec{y}_m$ (type 1) proportional to the deflection or the time derivative thereof, for example the acceleration $\ddot{\vec{y}}_m$ (type 2), are obtained. The latter can be converted into a signal proportional to the deflection by means of a suitable transformation.

The term "system" as used here relates to effective voltages on the drives 24, 25 as well as the mechanical properties of the displacement device. The coupling of the spatial axes or directions results from the structural design of the displacement device.

The goal of the feed forward control is to adapt $\vec{u}$ before each line in such a way that $\hat{y}$ comes as close as possible to the target movement $\hat{r}$ for the following line. Assuming linearity, G becomes a matrix and the problem is reduced to calculating the inverse of G and applying the desired form of $\vec{r}$.

$$\vec{u} = G^{-1} \vec{r} \quad (4)$$

In the general case, the matrix G has the rank N×d, N being the maximum order of the Fourier coefficients from equation (2) and d being the number of coupled axes. For the following derivation, we assume for the sake of simplicity that different frequency terms do not couple with each other.

As a result of this, equation (3) becomes $$\vec{y}_\omega = G_\omega \vec{u}_\omega, \quad (5)$$

the rank of the matrix G having been reduced to d. The index ω is omitted in the following. In an iterative form, equation (4) can then be written in one of the following forms for the iteration k:

$$\vec{u}_{k+1} = G_k^{-1} \vec{r} \quad (6)$$

or $$\vec{u}_{k+1} = \vec{u}_k + G_k^{-1}(\vec{r} - \vec{r}_k). \quad (7)$$

In the example of controlling two axes, $\vec{r} = (x, y)^\dagger$, $\vec{u} = (u, v)^\dagger$ and $$\begin{pmatrix} x \\ y \end{pmatrix} = G_k \begin{pmatrix} u \\ v \end{pmatrix} \quad (8)$$

is obtained. If equation (3) is multiplied from the right with $\vec{u}^\dagger$, the transposed-conjugate vector to $\vec{u}$, $$\vec{r}\vec{u}^\dagger = G\vec{u}\vec{u}^\dagger, \quad (9)$$

is obtained, or written out in the iteration k $$\begin{pmatrix} x_k \bar{u}_k & x_k \bar{v}_k \\ y_k \bar{u}_k & y_k \bar{v}_k \end{pmatrix} = G_k \begin{pmatrix} u_k \bar{u}_k & u_k \bar{v}_k \\ v_k \bar{u}_k & v_k \bar{v}_k \end{pmatrix}, \quad (10)$$

$\bar{u}$ stands for the complex conjugation of u. We will now form the mean $\langle \cdot \rangle$ of all recorded data points:

$$\begin{pmatrix} \langle x \bar{u} \rangle & \langle x \bar{v} \rangle \\ \langle y \bar{u} \rangle & \langle y \bar{v} \rangle \end{pmatrix} = G \begin{pmatrix} \langle u \bar{u} \rangle & \langle u \bar{v} \rangle \\ \langle v \bar{u} \rangle & \langle v \bar{v} \rangle \end{pmatrix}. \quad (11)$$

It does not matter what kind of mean is used here, as long as the mean is linear in the components and the relationship 1=1 is satisfied. Examples include exponential smoothing, the sliding mean or the arithmetic mean of all recorded data points.

Accordingly, $G^{-1}$ can be expressed as follows:

$$G^{-1} = \begin{pmatrix} \langle u \bar{u} \rangle & \langle u \bar{v} \rangle \\ \langle v \bar{u} \rangle & \langle v \bar{v} \rangle \end{pmatrix} \begin{pmatrix} \langle x \bar{u} \rangle & \langle x \bar{v} \rangle \\ \langle y \bar{u} \rangle & \langle y \bar{v} \rangle \end{pmatrix}^{-1} \quad (12)$$

For sufficient convergence of the actual movement toward the target movement, the determinant of the second matrix in equation (12) becomes very small. A minimum can be specified for the determinant, from which $G^{-1}$ is set equal to zero in equation (7) and the calculation according to equation (12) is bypassed.

The noise of the measurement data prevents the determinant from becoming exactly zero. In addition, starting values for the iteration must be selected such that the algorithm starts to run in a stable manner.

The form of the feed forward control selected in this way converges reliably within a few iteration steps and thus leads in a short time to an optimized trajectory of the measuring probe 2 relative to the measurement sample 6. The generated control of the drives 24, 25, which are formed, for example, with the piezo actuators, is adapted according to all the coupling and disturbing influences of the measuring device.

A coupled control is provided, which is explained further below. In this case, the phrase "coupled control" refers to the fact that the control takes into account coupled movements in the various spatial axes/spatial directions. The control takes into account a movement in one of the spatial axes/spatial directions that only occurs or is caused because a movement occurs or is takes place in another of the spatial axes/spatial directions. The proposed control treats or takes said spatial axes/spatial directions into account as coupling components. The spatial axes/spatial directions are thus not controlled independently of one another, but rather coupled.

An adjustment to the dynamic closed-loop control (the recalculation of $G^{-1}$) does not have to be carried out continuously; it can be carried out only occasionally or only once before the actual measurement begins. This then restricts, in that other dynamic, newly occurring disturbances cannot be suppressed.

The following can be provided to extend the control with external, constant, periodic disturbances: If, instead of the model in equation (5), the extended model $\vec{r}_\omega = G_\omega \vec{u}_\omega + \vec{f}_\omega$ is used for derivation, where $\vec{f}_\omega$ is constant in each case for a fixed frequency ω, then the following is obtained:

$$G^{-1} = \begin{pmatrix} \langle u \bar{u} \rangle - \langle u \rangle \langle \bar{u} \rangle & \langle u \bar{v} \rangle - \langle u \rangle \langle \bar{v} \rangle \\ \langle v \bar{u} \rangle - \langle v \rangle \langle \bar{u} \rangle & \langle v \bar{v} \rangle - \langle v \rangle \langle \bar{v} \rangle \end{pmatrix} \begin{pmatrix} \langle x \bar{u} \rangle - \langle x \rangle \langle \bar{u} \rangle & \langle x \bar{v} \rangle - \langle x \rangle \langle \bar{v} \rangle \\ \langle y \bar{u} \rangle - \langle y \rangle \langle \bar{u} \rangle & \langle y \bar{v} \rangle - \langle y \rangle \langle \bar{v} \rangle \end{pmatrix}^{-1}. \quad (13)$$

If any non-linear frequency couplings that may occur are very small, this model is a way of controlling them with only minimally increased effort.

If all frequency couplings are to be controlled, the full matrix G can be formed from equation (4) and inverted. For rapid feed forward control, data from the various sensor types of the sensor device can be combined into a position signal in order to further reduce measurement errors.

The features disclosed in the above description, the claims and the drawings may be relevant to implementing the different embodiments both individually and also in any combination.

The invention claimed is:

1. A measuring device for a scanning probe microscope, comprising
   a sample receptacle that is configured to receive a measurement sample to be examined;
   a measuring probe that is arranged on a probe holder and that has a probe tip with which the measurement sample can be measured;
   a displacement device that is configured to move the measuring probe and the sample receptacle relative to each other, in order to measure the measurement sample, in such a manner that the measuring probe, in order to measure the measurement sample, executes a raster movement relative to said measurement sample in at least one spatial direction;

a control device that is connected to the displacement device and controls the relative movement between the measuring probe and the sample receptacle; and a sensor device that is configured to detect movement measurement signals for an actual movement of the measuring probe and/or the sample receptacle that is executed during the relative movement between the measuring probe and the sample receptacle in order to measure the measurement sample, and to relay the movement measurement signals to the control device, the movement measurement signals indicating a first movement component in a first spatial direction that disrupts the raster movement and a second movement component in a second spatial direction that disrupts the raster movement, which second spatial direction extends transversely to the first spatial direction;

wherein the first movement component disrupting the raster movement and the second movement component disrupting the raster movement correspond to coupled movements in which the second movement component disrupting the raster movement is caused only by the first movement component disrupting the raster movement; and wherein the control device is further configured to control the relative movement between the measuring probe and the sample receptacle as a function of the movement measurement signals by a coupled control based on the coupled movements in such a manner that the displacement device is acted upon by the control device with compensating control signal components which, for the movement of the measuring probe and/or the sample receptacle, cause a first countermovement which substantially compensates for the first disruptive movement component in the first spatial direction, and/or cause a second countermovement which substantially compensates for the second disruptive movement component in the second spatial direction.

2. The measuring device according to claim 1, characterized in that the sensor device is configured to detect the movement measurement signals in the context of an absolute measurement.

3. The measuring device according to claim 1, characterized in that the sensor device is configured to detect movement measurement signals for the actual movement of the measuring probe and/or the sample receptacle, which movement measurement signals indicate a first movement component in the x direction of an x-y plane of the sample receptacle that disrupts the raster movement.

4. The measuring device according to claim 1, characterized in that the movement measurement signals include position measurement signals for the first movement component in the first spatial direction that disrupts the raster movement and position measurement signals for the second movement component in the second spatial direction that disrupts the raster movement.

5. The measuring device according to claim 1, characterized in that the control device and the displacement device are configured to execute the raster movement of the measuring probe relative to the measurement sample as a periodic movement in the at least one spatial direction during the measurement of the measurement sample.

6. The measuring device according to claim 5, characterized in that the control device and the displacement device are configured to control the periodic movement of the measuring probe relative to the measurement sample with respect to an amplitude and/or a phase of the periodic movement as a function of the movement measurement signals during the measurement of the measurement sample.

7. The measuring device according to claim 1, characterized in that the sensor device is configured, when measuring the measurement sample, to detect, as a function of time, first movement measurement signals for a movement of the measuring probe or sample receptacle which is moved to execute the relative movement between the measuring probe and the sample receptacle.

8. The measuring device according to claim 1, characterized in that the sensor device is configured, when measuring the measurement sample, to detect, as a function of time, second movement measurement signals for a movement of the sample receptacle or measuring probe which is not moved by means of the displacement device to execute the relative movement between the measuring probe and the sample receptacle.

9. The measuring device according to claim 1, characterized in that the sensor device has a capacitive sensor device.

10. The measuring device according to claim 1, characterized in that the sensor device is at least in part formed on at least one of the following device components: probe holder and sample receptacle.

11. The measuring device according to claim 1, characterized in that the measuring probe is formed with a cantilever.

12. The measuring device according to claim 1, characterized in that the control device and the displacement device are configured to execute the raster movement of the measuring probe relative to the measurement sample with an oscillation frequency of at least approximately 100 Hz during the measurement of the measurement sample.

13. The measuring device according to claim 1, characterized in that a further sensor device is provided, which is configured to detect further movement signals in the context of a relative movement.

14. A scanning probe microscope for scanning probe microscopic examination of a measurement sample, comprising a measuring device according to claim 1.

15. A method for scanning probe microscopic examination of a measurement sample by means of a scanning probe microscope, comprising the steps of arranging a measurement sample on a sample receptacle of a scanning probe microscope; and examining, by probe microscopy, the measurement sample by means of a measuring probe that is arranged on a probe holder and has a probe tip;

wherein the measuring probe and the sample receptacle are moved relative to each other by means of a displacement device such that the measuring probe executes a raster movement relative to the measurement sample in at least one spatial direction;

a control device that is connected to the displacement device and controls the relative movement between the measuring probe and the sample receptacle;

by means of a sensor device, movement measurement signals for a movement of the measuring probe and/or a movement of the sample receptacle that is executed during the relative movement between the measuring probe and the sample receptacle are detected, wherein the movement measurement signals indicate a first movement component in a first spatial direction that disrupts the raster movement and a second movement component in a second spatial direction that disrupts the raster movement, which second spatial direction extends transversely to the first spatial direction; and
wherein the first movement component disrupting the raster movement and the second movement component disrupting the raster movement correspond to coupled movements for which the second movement component disrupting the raster movement is caused by the first movement component disrupting the raster movement; and
   the movement measurement signals are relayed to the control device;
wherein the control device controls the relative movement between the measuring probe and the sample receptacle as a function of the movement measurement signals by a coupled control based on the coupled movements in such a manner that the displacement device is acted upon by the control device with compensating control signal components, which, for the movement of the measuring probe and/or the sample receptacle, cause a first countermovement which substantially compensates for the first disruptive movement component in the first spatial direction, and/or cause a second countermovement which substantially compensates for the second disruptive movement component in the second spatial direction.

* * * * *